United States Patent

Heinold et al.

[11] 4,034,881
[45] July 12, 1977

[54] OUTRIGGER AND FRAME SUPPORT MEMBER

[75] Inventors: Lloyd K. Heinold; Walter M. Shaffer, both of Peoria, Ill.

[73] Assignee: Caterpillar Tractor Co., Peoria, Ill.

[21] Appl. No.: 650,204

[22] Filed: Jan. 19, 1976

[51] Int. Cl.² .................................... B65G 47/00
[52] U.S. Cl. .............................. 214/730; 212/145; 280/763
[58] Field of Search .......... 214/16.4 A, 16 B, 75 R, 214/75 G, 75 H, 730–731, 660, 670–674; 212/145; 180/89 R; 280/763, 764, 43.18, 43.24; 296/1 R

[56] References Cited

U.S. PATENT DOCUMENTS

| | | | |
|---|---|---|---|
| 2,621,811 | 12/1952 | Lull | 214/674 X |
| 2,774,604 | 12/1956 | Rendel et al. | 280/43.18 |
| 3,168,956 | 2/1965 | Jinks et al. | 214/730 X |
| 3,199,696 | 8/1965 | Chrysler et al. | 214/75 R |
| 3,306,481 | 2/1967 | Bowman et al. | 214/670 |
| 3,577,664 | 5/1971 | Sing et al. | 280/43.24 |

FOREIGN PATENT DOCUMENTS

| | | | |
|---|---|---|---|
| 68,055 | 10/1957 | France | 214/730 |
| 1,051,735 | 2/1959 | Germany | 214/730 |
| 1,129,108 | 5/1962 | Germany | 214/75 G |
| 968,584 | 9/1964 | United Kingdom | 214/674 |

Primary Examiner—Robert J. Spar
Assistant Examiner—R. B. Johnson
Attorney, Agent, or Firm—Phillips, Moore, Weissenberger, Lempio & Majestic

[57] ABSTRACT

A lift truck vehicle suitable for use in ultra narrow aisle applications includes a pair of combined side frame and outrigger members interconnecting front and rear body portions of the vehicle. The combined side frame and outrigger members provide both structural integrity to the vehicle body as well as serve to stabilize the vehicle when loading and unloading loads on opposite sides of the vehicle. The combined side frame and outrigger members are generally elongated and have a pair of flanges at opposite ends thereof including shafts thereon rotatively journaled into the front and rear body portions. A linear motor interconnecting corresponding flanges of the combination side frame and outrigger members provides motive power for rotating members from their roading or travelling position away from contact with the ground support surface into their stabilizing position in contact with the ground support surface. When contacting the ground support surface, the side frame and outrigger members are conveniently low in profile so that the vehicle carriage and forks may be lowered to handle loads on common type pallets at floor level.

6 Claims, 6 Drawing Figures

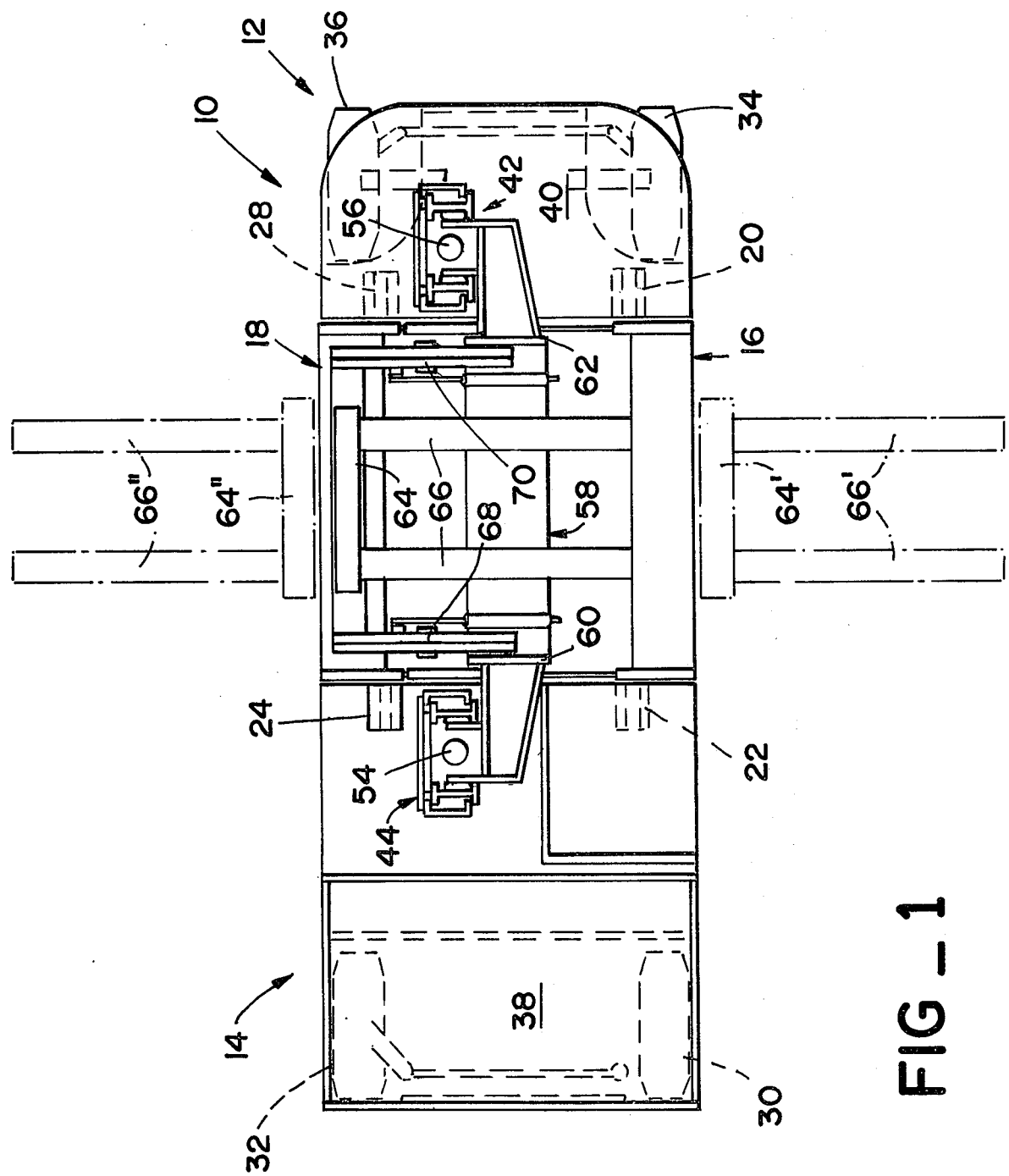
FIG_1

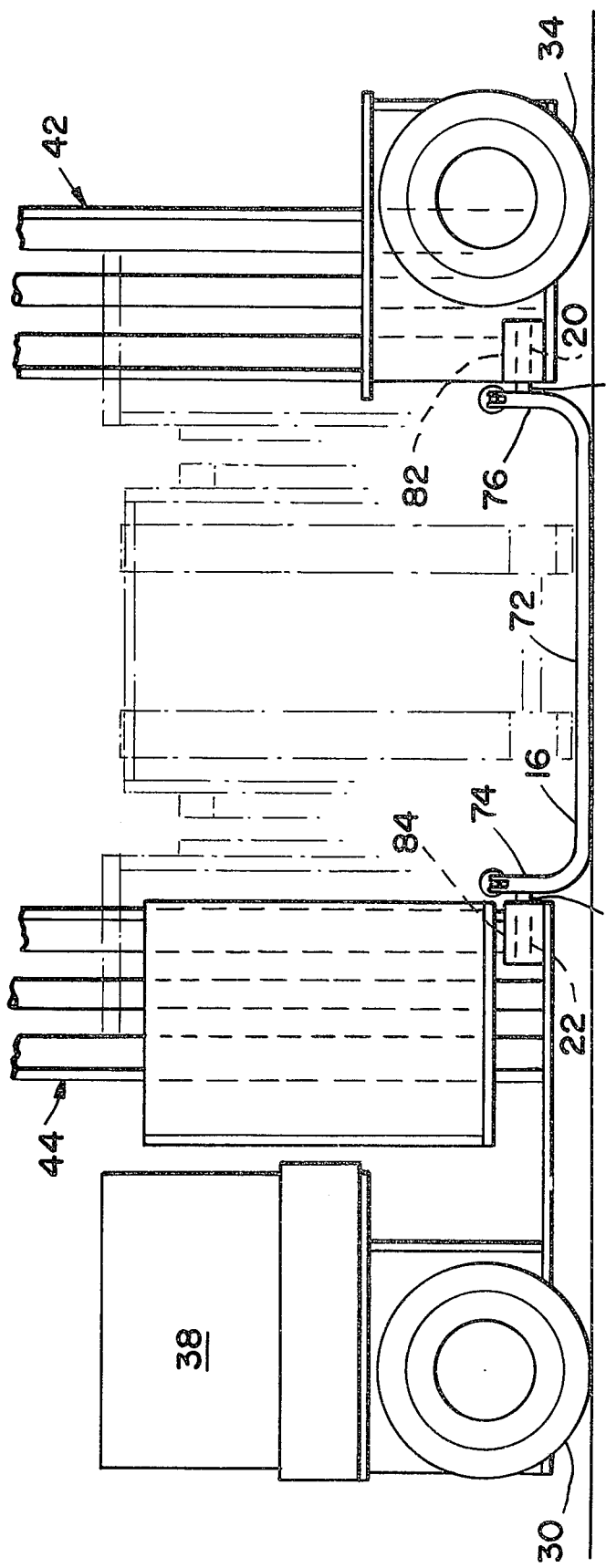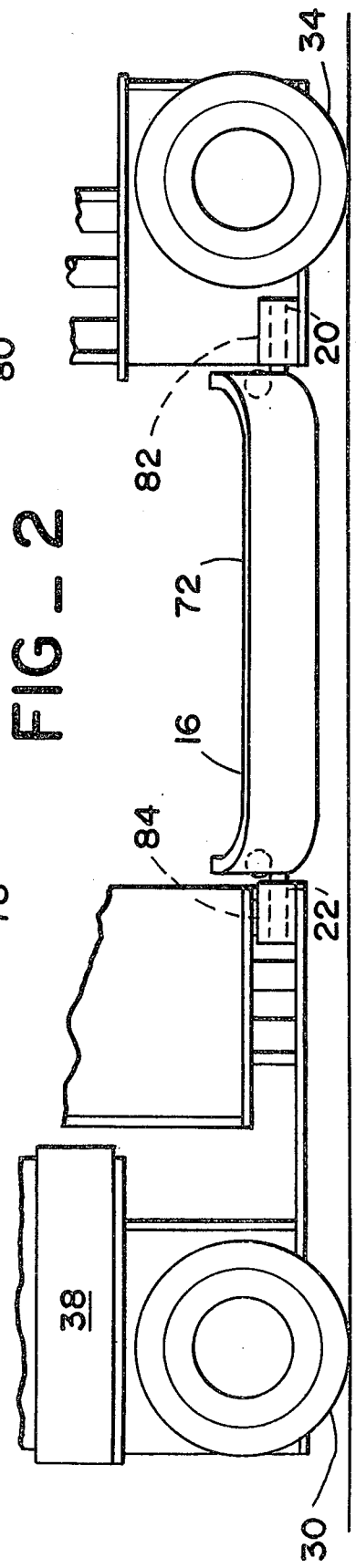

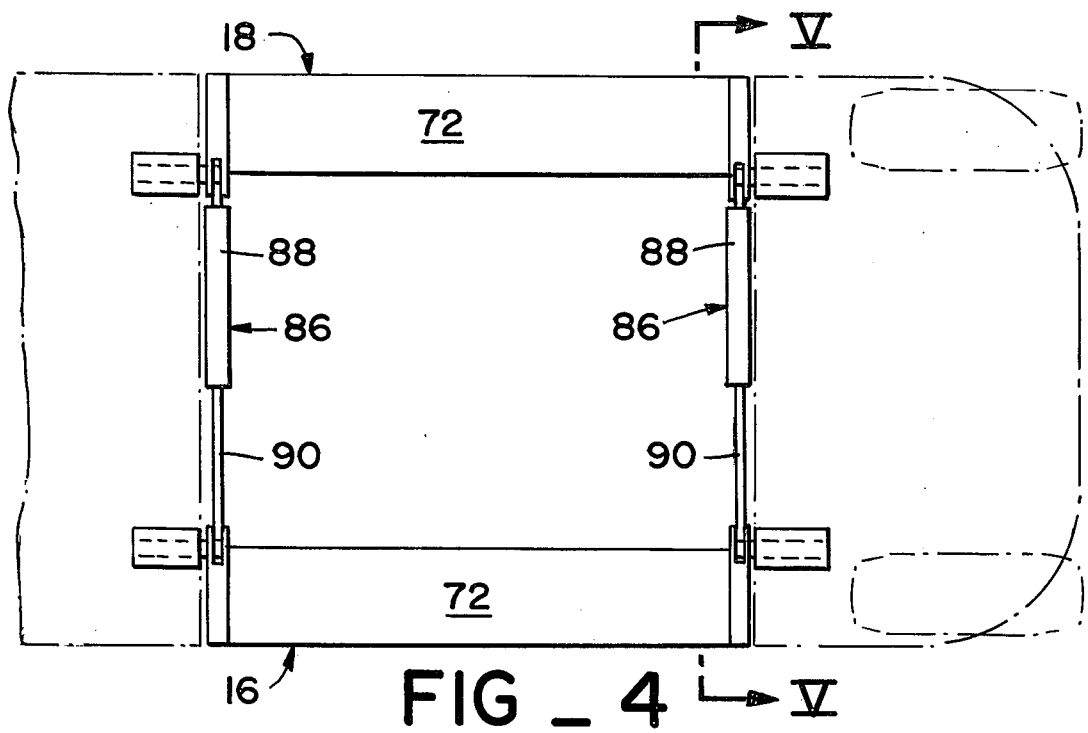
FIG_4
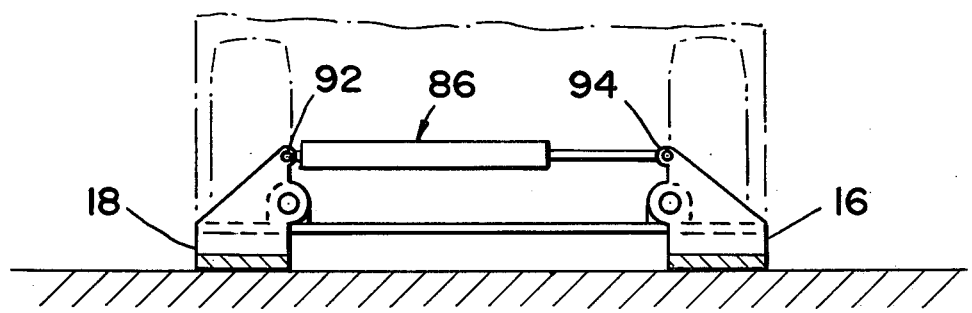
FIG_5
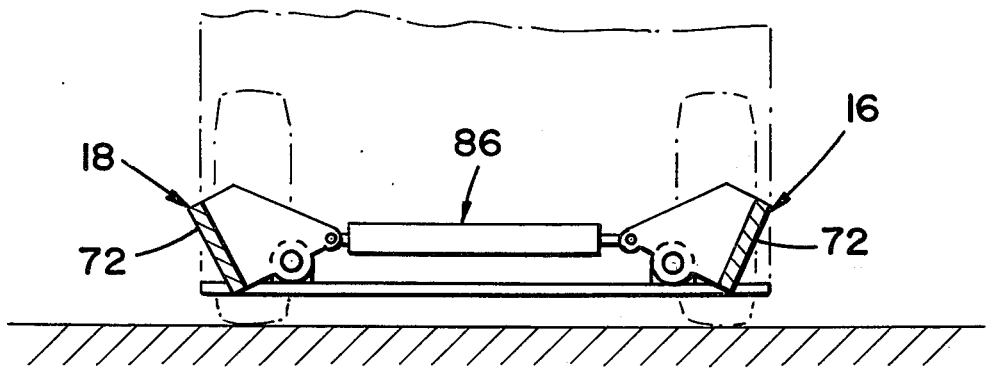
FIG_6

OUTRIGGER AND FRAME SUPPORT MEMBER

BACKGROUND OF THE INVENTION

This invention relates to lift truck vehicles for use in ultra narrow aisle applications. More particularly, this invention relates to such a vehicle having combination side frame and outrigger members. Currently, ultra narrow aisle lift trucks are finding increasing use due to the necessity of obtaining increased storage utilization from available warehouse space. For this reason very narrow aisles are being used in such warehouses. This maximizes productive storage space available in such warehouses. Ultra narrow aisle lift trucks have been developed which are very narrow and which are in fact only slightly narrower than the rather narrow aisles which they must traverse between adjacent load spaces. It is extremely desirable to be able to load and unload from both of the facing stacks on opposite sides of the narrow aisles. Further, it is necessary to be able to load at ground level as well as at higher levels typically from vertically oriented storage racks.

When loading and unloading from upper tiers, a problem is encountered since large moments are generated about the lift masts as the loads are traversed outward into the loaded spaces of the upper tiers. This requires the utilization of some sort of means for stabilizing the load. However, the narrow aisle environment leaves little room for the normal type of outrigger which is extensible from the vehicle. See U.S. Pat. No. 3,586,183 to Shaffer which is exemplary of such an outrigger. Typically, these outriggers require space to the side of the vehicle which is not readily available in the narrow aisle environments.

Further, these conventional outrigger members require additional structure which must be carried by the vehicle and effectively reduces the load carrying capability thereof.

SUMMARY AND OBJECTS OF THE INVENTION

Accordingly, it is a primary object of this invention to provide an ultra narrow aisle lift truck vehicle with combined side frame and outrigger members.

It is a further object of this invention to provide such a vehicle having side frame and outrigger members which are capable of producing vehicle structure integrity as well as lateral stability.

It is a further object of this invention to provide such a vehicle having side frame and outrigger members which are retractable to a roading position and extensible to the stabilizing position in contact with the ground support surface.

It is a further object of this invention to provide such a side frame and outrigger member which is positioned by the linear motor.

The invention takes the form of an ultra narrow aisle lift truck vehicle having front and rear body portions supported by a plurality of wheels. The front and rear body portions are interconnected by a pair of generally elongated combination side frame and outrigger members. Each side frame and outrigger member comprises a generally rectangular portion having a pair of flanges extending from th ends thereof. The flanges are mounted on shafts which are journaled within the front and rear body portion for rotation. A linear motor interconnecting corresponding flanges of the side frame and outrigger pair causes simultaneous movement thereof from the roading position to a stabilizing position substantially in contact with the ground support surface. The profile of the combination side frame and outrigger member when in the stabilizing position is sufficiently low so that common type pallets at floor level can be conveniently handled by a side loading carriage having forks thereon mounted on the vehicle. Other objects of the invention will become more readily apparent from a review of the following description and accompanying drawings.

BRIEF DESCRIPTION OF THE DRAWINGS

FIG. 1 is a top plan view of a lift truck vehicle of the instant invention illustrating the position capability of the side loading carriage;

FIG. 2 is a partial side elevational view of the vehicle of FIG. 1 showing the outrigger members extended;

FIG. 3 is a view of the same showing the outrigger members retracted;

FIG. 4 is a partial top plan view of the vehicle with portions removed for purposes of clarity and showing details of attachment of the outrigger members to the vehicle body portions;

FIG. 5 is a cross-sectional view taken along lines V—V in FIG. 4, showing details of the power means for actuating the outrigger members and with the members in their ground engaging position; and FIG. 6 is a view of the same with the outrigger members retracted.

DETAILED DESCRIPTION

Turning to FIG. 1, there is shown generally at 10 the lift truck vehicle suitable for operation in narrow aisles. The vehicle 10 has front and rear vehicle body sections 12,14. These front and rear sections are interconnected by rotatably secured, elongated frame support and outrigger members 16,18, as will be more fully hereinafter described. The outrigger members are secured to the front and rear body portions by means of a plurality of pivots 20,22,24,28.

The vehicle is supported by a plurality of steerable wheels 30,32,34,36. The wheels are steerable by means of a steering means (not shown). The source of motive power for propelling the rear wheels is located generally at 38 in the rear body portion. Similarly, a source of motive power for propelling the front wheels is located in the front body portion generally at 40.

Mounted on the front and rear body portions 12,14, respectively, are front and rear masts 42,44. The lift masts conventionally include hydraulic cylinders 54,56 therein for extending the masts and raising the cross member 58 connected therebetween. Cross member 58 includes a pair of upright members 60,62 at the ends thereof. Thus, cross member 58 is generally U-shaped in configuration.

A carriage 64 having a pair of forks 66 mounted thereon is mounted to the uprights 60,62 by means of a pair of pantograph assemblies 68,70. The pantograph assemblies are of the over center type and are more fully disclosed in application Ser. No. 650,587, filed Jan. 19, 1976.

The pantograph arms of the over center type are powered by power means (not shown) so that the carriage may be extended laterally to opposite sides of the vehicle to position 64′ and 64″. The forks may be flipped over as shown at 66′ and 66″ to handle loads on laterally opposite sides of the vehicle. Thus, the carriage and forks including any load thereon are traversible to both sides of the vehicle to facilitate load handling in the facing load spaces on opposite sides of the narrow aisle.

Turning to FIGS. 2 and 3, the combination frame support member and outrigger member 16 on the right-hand side of the vehicle is shown respectively in its ground engaging and road positions. As best seen in FIG. 2, each combination frame support member and outrigger member is comprised of an elongated rectangular portion 72 having a pair of flanges 74,76 extending at right angles therefrom. The flanges are supported on shafts 78,80, respectively, which extend at right angles therefrom and provide an axis of rotation for the member 72. The shafts are journaled within bearings 82,84 within body portions to comprise pivots 20,22, respectively. As may be appreciated from viewing FIG. 2, the carriage and forks are able to successfully handle loads very low to the ground in view of the low profile presented by member 72 in the stabilizing attitude.

Furthermore, as may be best appreciated in FIG. 4, the profile presented by the outrigger members is substantially in the plan or outline of the vehicle when in the stabilizing mode. This is advantageous since the vehicle may be thereby operated in very narrow aisles.

As best seen in FIGS. 5 and 6, a hydraulic cylinder 86 having a body 88 and a rod 90 extending therefrom is interconnected between corresponding flanges of the outrigger pairs 72. The cylinder is connected by means of pivots 92,94 so that upon retraction of the cylinder by power means (not shown), the outrigger members may be retracted to their roading phase (see FIG. 6).

The hydraulic cylinder can be conveniently any motor means such as a linear hydraulic motor. In this manner, simultaneous actuation of both of the combination frame support and outrigger members is provided. While two pairs of such motors are shown, the actuation of the outrigger members can be accomplished with but a single motor attached to one of the pairs of corresponding flanges.

While the present invention is illustrated with respect to a specific embodiment, it is to be understood that numerous changes and modifications may be made in the construction arrangement of parts of the invention without departing from the spirit and scope thereof as defined by the appended claims.

What is claimed is:

1. In a vehicle having front and rear separate and discrete body portions, a plurality of wheels on each of said front and rear body portions, a load handling means mounted on and extending between said body portions whereby loads may be picked up and deposited adjacent said vehicle, combination frame support and outrigger means comprising a pair of generally rectangular elongated members with flange means extending from each end thereof, means pivotally mounting said flange means to a respective body portion adjacent the lateral sides thereof, thereby interconnecting said front and rear body portions, providing additional vehicle structural integrity between said front and rear body portions and means selectively actuable to rotate said frame support and outriggers members on said mounting means from a first position to a ground engaging position to stabilize said vehicle during loading and unloading.

2. The invention of claim 1 wherein said pivot means comprises bearings mounted on said front and rear body portions and a shaft extending from said flange means, said shaft being journaled within said bearings.

3. The invention of claim 2 wherein said combination frame support and outrigger members further comprise motor means for moving said frame support and outrigger members.

4. The invention of claim 3 wherein said motor means is a linear hydraulic motor.

5. The invention of claim 4 wherein said linear hydraulic motor comprises a hydraulic cylinder pivotally connected between a pair of corresponding flanges of said combination frame support and outrigger members.

6. The invention of claim 5 further including a second hydraulic cylinder pivotally connected between the remaining flanges of the combination frame support and outrigger members.

* * * * *